United States Patent
Jo et al.

(10) Patent No.: US 11,911,691 B2
(45) Date of Patent: Feb. 27, 2024

(54) DISPLAY DEVICE AND METHOD OF PROVIDING GAME SCREEN USING THE SAME

(71) Applicant: LG ELECTRONICS INC., Seoul (KR)

(72) Inventors: Yongjae Jo, Seoul (KR); Sungdae Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/305,783

(22) Filed: Jul. 14, 2021

(65) Prior Publication Data

US 2022/0072418 A1   Mar. 10, 2022

(30) Foreign Application Priority Data

Sep. 7, 2020 (KR) .......................... 10-2020-0113864

(51) Int. Cl.
*A63F 13/25* (2014.01)
*H04N 5/57* (2006.01)

(52) U.S. Cl.
CPC .............. *A63F 13/25* (2014.09); *H04N 5/57* (2013.01)

(58) Field of Classification Search
CPC ...... A63F 13/25; H04N 5/57; H04N 21/4854; G09G 2320/0626
See application file for complete search history.

(56) References Cited

U.S. PATENT DOCUMENTS

| | | | |
|---|---|---|---|
| 10,360,875 B2 | 7/2019 | Kang et al. | |
| 10,376,786 B2 * | 8/2019 | Lee | G06F 3/02 |
| 10,665,204 B1 * | 5/2020 | Goodsitt | G06N 3/08 |
| 11,107,440 B2 * | 8/2021 | Aurongzeb | H04W 4/30 |
| 2005/0117813 A1 | 6/2005 | Nishida et al. | |
| 2006/0084507 A1 * | 4/2006 | Miyazaki | A63F 13/48 |
| | | | 463/43 |

(Continued)

FOREIGN PATENT DOCUMENTS

| | | |
|---|---|---|
| JP | 2008294539 | 12/2008 |
| KR | 1020170076478 | 7/2017 |

(Continued)

OTHER PUBLICATIONS

Korean Intellectual Property Office Application No. 10-2020-0113864, Notice of Allowance dated Sep. 25, 2021, 5 pages.

(Continued)

*Primary Examiner* — Seng H Lim
(74) *Attorney, Agent, or Firm* — LEE, HONG, DEGERMAN, KANG & WAIMEY

(57) ABSTRACT

A display device includes an external device interface to which an external device is input, a display configured to output a screen, and a processor configured to sense an input of the external device, determine whether a content type provided from the external device is a game, obtain game genre information of a game when the content type is the game, and control an output brightness of the screen output through the display by increasing or decreasing an input brightness of the screen input from the external device by a predetermined value based on the game genre information.

16 Claims, 16 Drawing Sheets

(56) References Cited

U.S. PATENT DOCUMENTS

| | | | |
|---|---|---|---|
| 2007/0191108 A1* | 8/2007 | Brunet De Courssou | ................... G07F 17/32 463/42 |
| 2008/0043031 A1* | 2/2008 | Jagmag | .................. H04N 21/47 348/E5.119 |
| 2010/0131355 A1* | 5/2010 | Kitchen | ................... A63F 13/30 705/14.43 |
| 2011/0216083 A1* | 9/2011 | McRae | ................ H04N 13/359 345/589 |
| 2012/0026182 A1* | 2/2012 | Ra | ........................ G09G 3/003 345/589 |
| 2016/0062568 A1* | 3/2016 | Takiguchi | ............. A63F 13/792 345/676 |
| 2016/0062628 A1* | 3/2016 | Takiguchi | ............. G06F 3/0482 715/778 |
| 2018/0218481 A1* | 8/2018 | Evans | ..................... H04N 5/20 |
| 2018/0220101 A1* | 8/2018 | Evans | ...................... G09G 5/02 |
| 2019/0099668 A1 | 4/2019 | Aliakseyeu et al. | |
| 2019/0134498 A1* | 5/2019 | Lee | ......................... A63F 13/25 |
| 2019/0258114 A1* | 8/2019 | Kwon | ................... H05B 45/12 |
| 2019/0327526 A1* | 10/2019 | Navin | .............. H04N 21/25891 |
| 2020/0336716 A1* | 10/2020 | Kwon | ...................... H04N 9/64 |
| 2022/0005072 A1* | 1/2022 | Chhipa | .................. G06Q 30/02 |
| 2022/0032199 A1* | 2/2022 | Rudi | ....................... A63F 13/35 |

FOREIGN PATENT DOCUMENTS

| | | |
|---|---|---|
| KR | 1020180032750 | 4/2018 |
| WO | 2017162539 | 9/2017 |

OTHER PUBLICATIONS

European Patent Office Application Serial No. 21190237.4, Search Report dated Feb. 4, 2022, 7 pages.

\* cited by examiner

DISPLAY DEVICE AND METHOD OF PROVIDING GAME SCREEN USING THE SAME

CROSS-REFERENCE TO RELATED APPLICATIONS

Pursuant to 35 U.S.C. § 119(a), this application claims the benefit of earlier filing date and right of priority to Korean Patent Application No. 10-2020-0113864, filed on Sep. 7, 2020, the contents of which are hereby incorporated by reference herein in its entirety.

BACKGROUND

The present disclosure relates to a display device, and more particularly, to a display device capable of providing an optimal image quality for each game genre, and a method of providing a game screen using the same.

Recently, users enjoy various games through a display device, such as a television or a monitor, using an electronic device, such as a video game console, a smart phone, or a computer.

In addition, with the development of the game industry, the genre of games has been diversified and complicated.

However, although the genre of games has recently been diversified, a display device that outputs a game screen displays a game screen with a default screen setting value or a last screen setting value regardless of the genre of games.

When receiving a game screen through a display device, game players have to directly change a screen settings of a display according to the genre of games.

Therefore, there is an increasing need for display devices for game players.

SUMMARY

The present disclosure provides a display device capable of displaying an optimal game screen for each game genre.

The present disclosure provides a display device capable of determining the genre of games input from an external device and automatically displaying an optimal game screen for each game genre.

According to one embodiment of the present disclosure, a display device includes an external device interface to which an external device is input, a display configured to output a screen, and a processor configured to sense an input of the external device, determine whether a content type provided from the external device is a game, obtain game genre information of a game when the content type is the game, and control output brightness of the screen output through the display by increasing or decreasing input brightness of the screen input from the external device by a predetermined value based on the game genre information.

According to one embodiment of the present disclosure, a display device includes a processor configured to increase first output brightness by a predetermined increase value with respect to the first input brightness when game genre information is a first game genre related to a shooting game and when first input brightness of a screen input from an external device is lower than a predetermined first reference brightness, and to decrease first output brightness by a predetermined decrease value with respect to the first input brightness when the first input brightness is higher than the first reference brightness.

According to one embodiment of the present disclosure, a display device includes a processor configured to increase an increase value of first output brightness with respect to first input brightness up to a first maximum brightness increase point when first input brightness is lower than a first reference brightness.

According to one embodiment of the present disclosure, a display device includes a processor configured to increase a decrease value of first output brightness with respect to first input brightness up to a first maximum brightness decrease point when first input brightness is higher than a first reference brightness.

According to one embodiment of the present disclosure, a display device includes a processor configured to decrease second output brightness by a predetermined decrease value with respect to the second input brightness when game genre information is a second game genre related to a role-playing game and when first input brightness of a screen input from an external device is lower than a predetermined second reference brightness, and to increase second output brightness by a predetermined increase value with respect to the second input brightness when the second input brightness is higher than the second reference brightness.

According to one embodiment of the present disclosure, a display device includes a processor configured to increase a decrease value of second output brightness with respect to second input brightness up to a second maximum brightness decrease point when second input brightness is lower than a second reference brightness.

According to one embodiment of the present disclosure, a display device includes a processor configured to increase an increase value of second output brightness with respect to second input brightness up to a second maximum brightness increase point when second input brightness is higher than a second reference brightness.

According to one embodiment of the present disclosure, a display device includes a processor configured to increase third output brightness by a predetermined increase value with respect to third input brightness of a screen input from an external device when game genre information is a third game genre related to a real-time strategy game.

According to one embodiment of the present disclosure, a display device includes a processor configured to increase a brightness increase value of third output brightness with respect to third input brightness from a minimum input brightness to a predetermined maximum brightness increase point.

According to one embodiment of the present disclosure, a display device includes a user input interface, and a processor configured to sense an input of an external device, to determine whether an automatic optimization mode is set when a content type is a game, to display a game screen setting interface through a display when the automatic optimization mode is not set, to change a screen setting value based on a screen setting command input through the user input interface, and to control output brightness of the screen based on the changed screen setting value.

According to one embodiment of the present disclosure, a method of providing a game screen includes sensing an input of an external device; determining whether a content type provided from the external device is a game; obtaining game genre information of the game; and controlling output brightness of a screen by increasing or decreasing input brightness of the screen input from the external device by a predetermined value based on the game genre information.

According to one embodiment of the present disclosure, a method of providing a game screen includes: when game genre information is a first game genre related to a shooting game and when first input brightness of a screen input from an external device is lower than a predetermined first reference brightness, increasing first output brightness by a predetermined increase value with respect to the first input brightness; when the first input brightness is higher than the first reference brightness, decreasing first output brightness with respect to the first input brightness by a predetermined decrease value; when the game genre information is a second game genre related to a role-playing game and when second input brightness of a screen input from the external device is lower than a predetermined second reference brightness, decreasing second output brightness by a predetermined decrease value with respect to the second input brightness; when the second input brightness is higher than the second reference brightness, increasing the second output brightness by a predetermined increase value with respect to the second input brightness; and when the game genre information is a third game genre related to a real-time strategy game, increasing third output brightness by a predetermined increase value with respect to third input brightness of a screen input from the external device.

The details of one or more embodiments are set forth in the accompanying drawings and the description below. Other features will be apparent from the description and drawings, and from the claims.

DETAILED DESCRIPTION OF THE EMBODIMENTS

Hereinafter, specific embodiments of the present disclosure will be described in detail with reference to the drawings.

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

Figure 1:
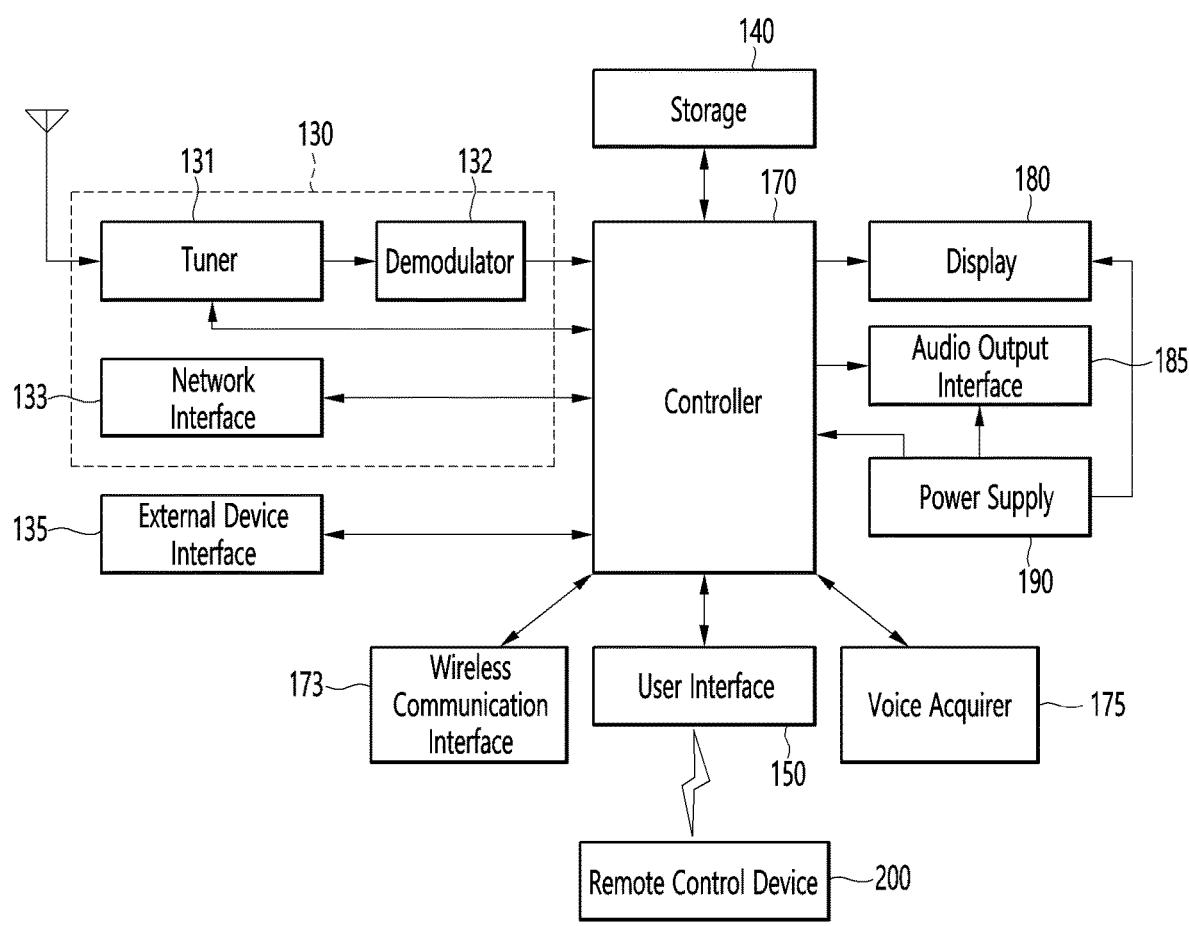
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception unit 130, an external device interface unit 135, a storage unit 140, a user interface unit 150, a control unit, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The network interface unit 133 can provide an interface for connecting the display device 100 to a wired/wireless network including the Internet network. The network interface unit 133 can transmit or receive data to or from another user or another electronic device through an accessed network or another network linked to the accessed network.

The network interface unit 133 can access a predetermined webpage through an accessed network or another network linked to the accessed network. In other words, the network interface unit 133 can transmit or receive data to or from a corresponding server by accessing a predetermined webpage through the network.

Then, the network interface unit 133 can receive contents or data provided from a content provider or a network operator. In other words, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an Internet or content provider or a network operator.

The network interface unit 133 can select and receive a desired application among applications open to the air, through network.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one an image or audio output from an external device that is wirelessly or wiredly connected to the display device 100 and deliver it to the control unit 170. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180. A voice signal of an external device input through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system, but this is just exemplary.

Additionally, some content data stored in the display device 100 can be transmitted to a user or an electronic device, which is selected from other users or other electronic devices pre-registered in the display device 100.

The storage unit 140 can store signal-processed image, voice, or data signals stored by a program in order for each signal processing and control in the control unit 170.

Additionally, the storage unit 140 can perform a function for temporarily storing image, voice, or data signals output from the external device interface unit 135 or the network interface unit 133 and can store information on a predetermined image through a channel memory function.

The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user.

The user interface unit 150 can deliver signals input by a user to the control unit 170 or deliver signals from the control unit 170 to a user. For example, the user interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user interface unit 150 can deliver, to the control unit 170, control signals input from local keys (not illustrated) such as a power key, a channel key, a volume key, and a setting key.

Image signals that are image-processed in the control unit 170 can be input to the display unit 180 and displayed as an image corresponding to corresponding image signals. Additionally, image signals that are image-processed in the control unit 170 can be input to an external output device through the external device interface unit 135.

Voice signals processed in the control unit 170 can be output to the audio output unit 185. Additionally, voice signals processed in the control unit 170 can be input to an external output device through the external device interface unit 135.

Besides that, the control unit 170 can control overall operations in the display device 100.

Additionally, the control unit 170 can control the display device 100 by a user command or internal program input through the user interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

The wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The voice acquisition module 175 can acquire audio. The voice acquisition module 175 may include at least one microphone (not shown), and can acquire audio around the display device 100 through the microphone (not shown).

The display unit 180 can convert image signals, data signals, or on-screen display (OSD) signals, which are processed in the control unit 170, or images signals or data signals, which are received in the external device interface unit 135, into R, G, and B signals to generate driving signals Meanwhile, the display device 100 illustrated in FIG. 1 is just one embodiment of the present disclosure and thus, some of the components illustrated can be integrated, added, or omitted according to the specification of the actually implemented display device 100.

In other words, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present disclosure described below can be performed by one of the display device described with reference to FIG. 1, an image processing device such as the separated set-top box, and a content playback device including the display unit 180 and the audio output unit 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a DC/DC converter for converting a level of the DC source power.

Figure 2:
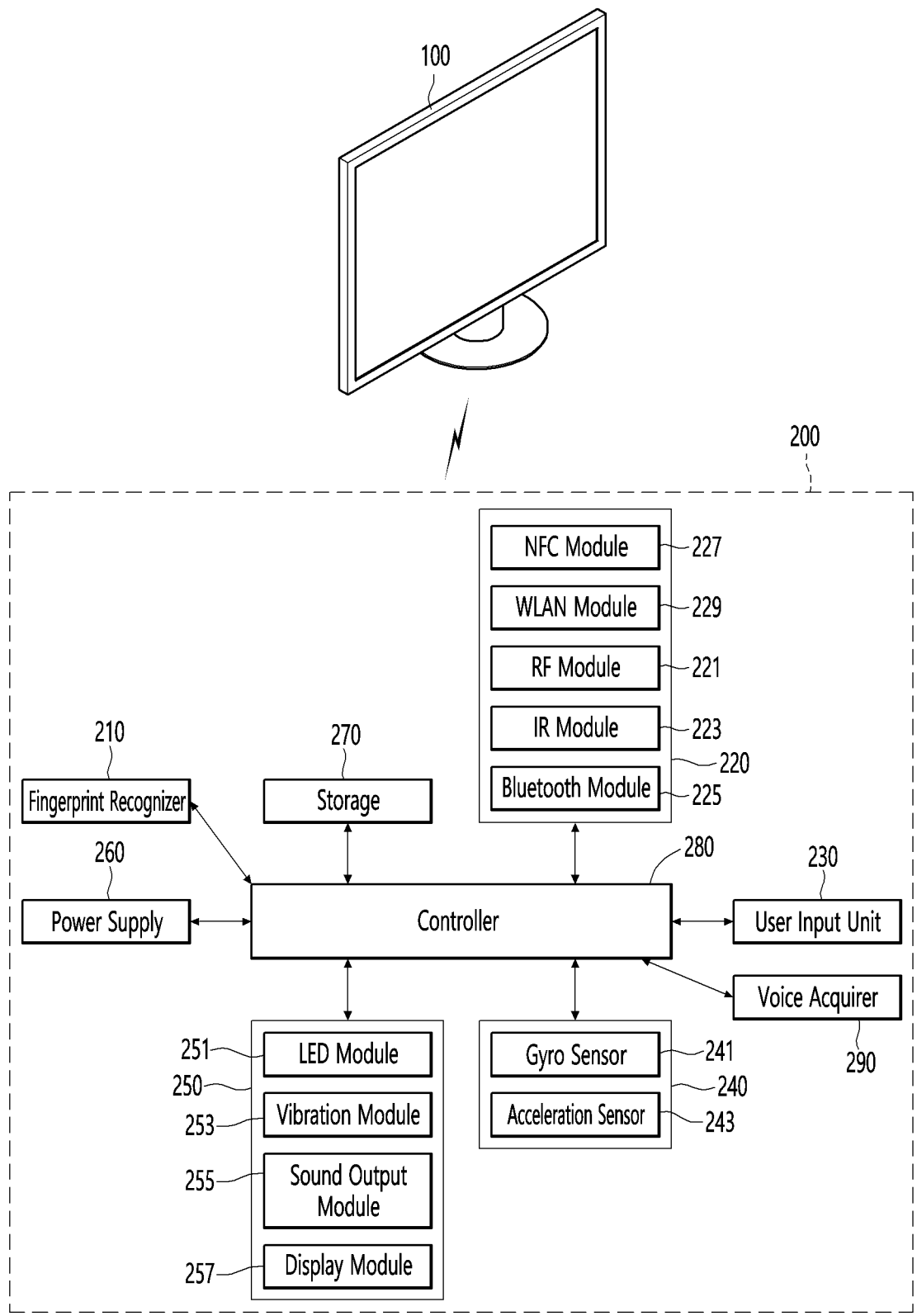
FIG. 2 is a block diagram illustrating a remote control device according to an embodiment of the present disclosure.
Figure 3:
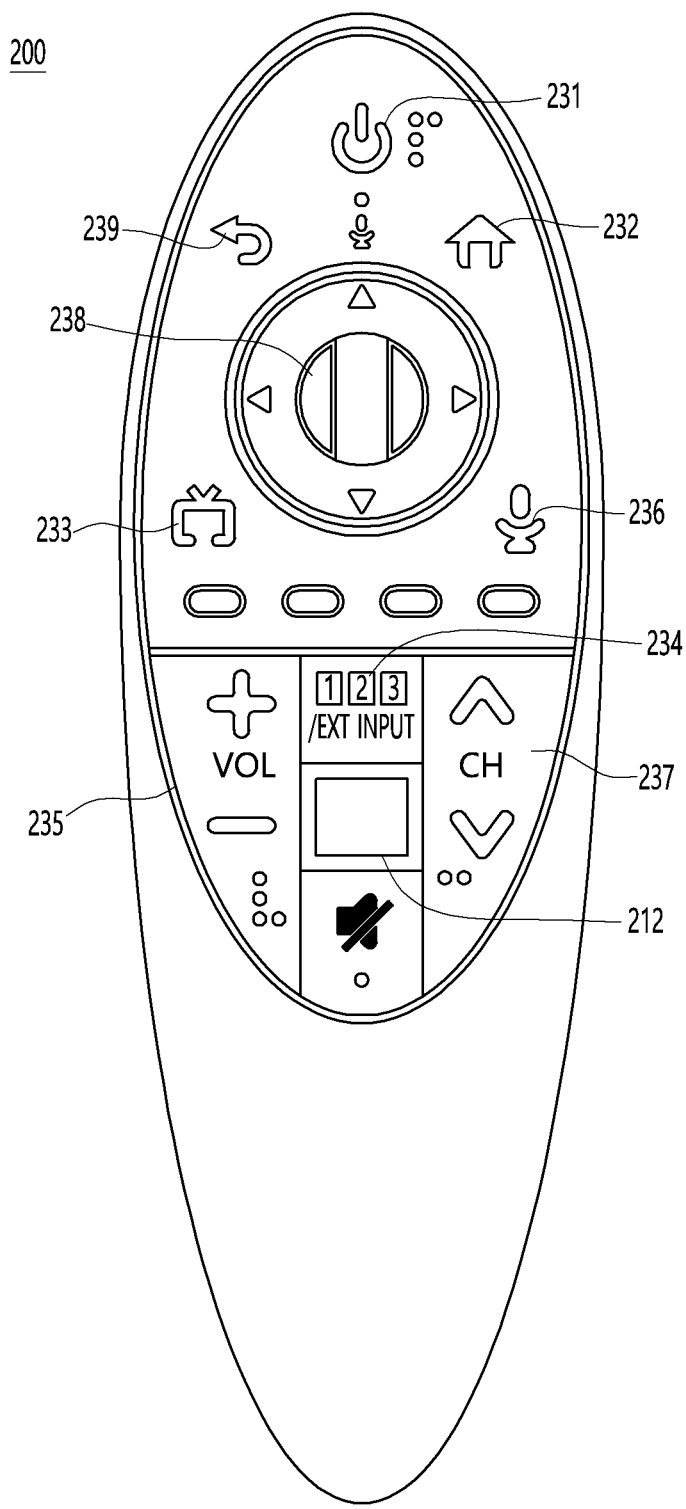
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device 200 according to an embodiment of the present disclosure.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 220 transmits/receives signals to/from an arbitrary any one of display devices according to the above-mentioned embodiments of the present disclosure.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

FIG. 2 will be described again.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present disclosure.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to control of the remote control device 200. The control unit 280 can transmit a signal corresponding to a predetermined key manipulation of the user input unit 235 or a signal corresponding to movement of the remote control device 200 sensed by the sensor unit 240 to the display device 100 through the wireless communication unit 225.

Additionally, the voice acquisition unit 290 of the remote control device 200 can obtain voice.

The voice acquisition unit 290 can include at least one microphone 291 and obtain voice through the microphone 291.

Figure 4:
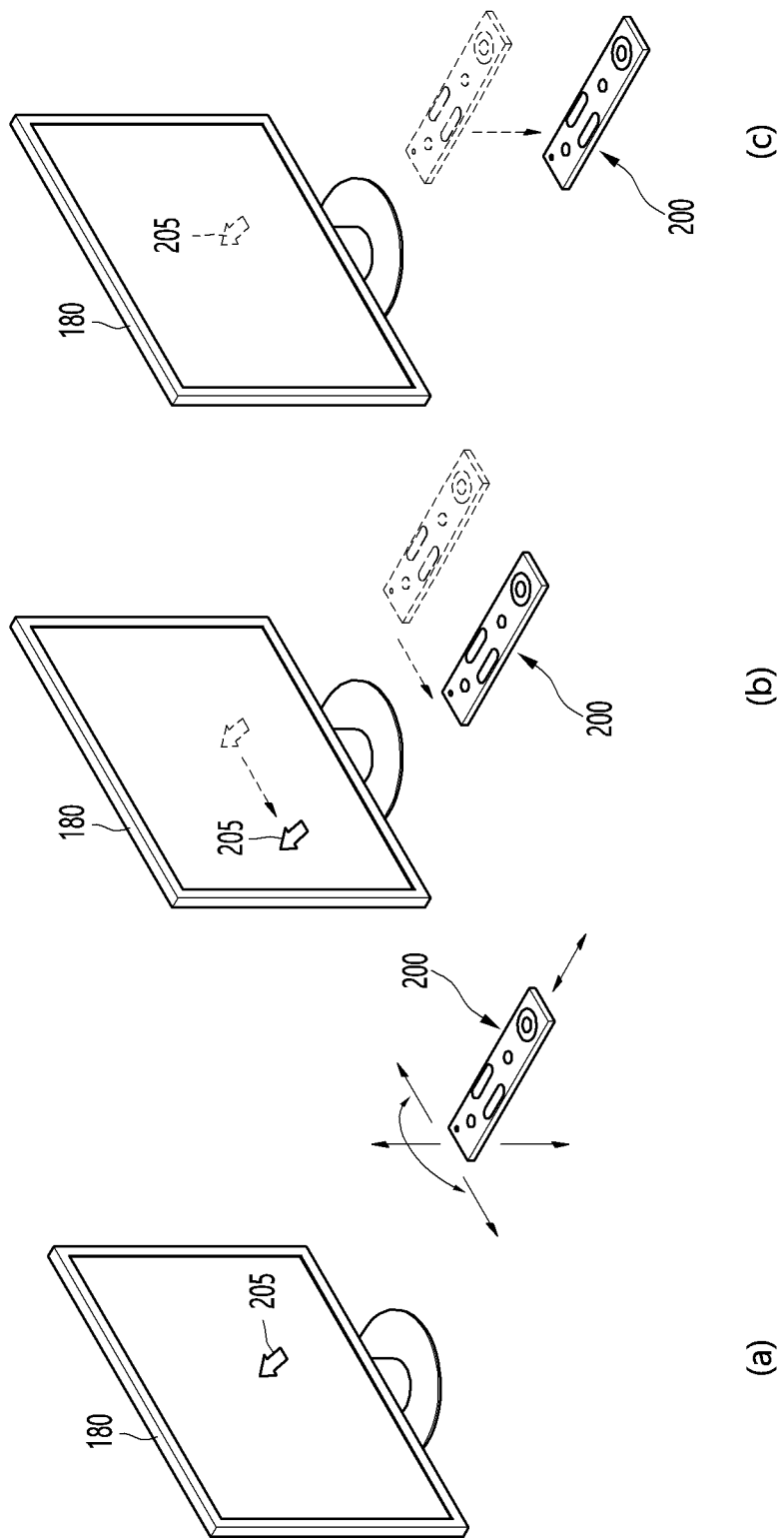
FIG. 4 is a view of utilizing a remote control device according to an embodiment of the present disclosure.

Next, FIG. 4 is illustrated.

FIG. 4 is a view of utilizing a remote control device according to an embodiment of the present disclosure.

FIG. 4(*a*) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(*b*) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(*c*) illustrates that while a specific button in the remote control device 200 is pressed, a user moves the remote control device 200 away from the display unit 180. Thus, a selection area in the display unit 180 corresponding to the pointer 205 can be zoomed in and displayed larger.

On the contrary, if the user moves the remote control device 200 to approach the display unit 180, the selection area in the display unit 180 corresponding to the pointer 205 may be zoomed out and reduced.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded. In other words, if the remote control device 200 is moved away from or closer to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Meanwhile, the controller 170 may also be referred to as a processor 170. The storage 140 may also be referred to as a memory 140. The wireless communication module 173 may also be referred to as a communication interface 173.

Figure 5:
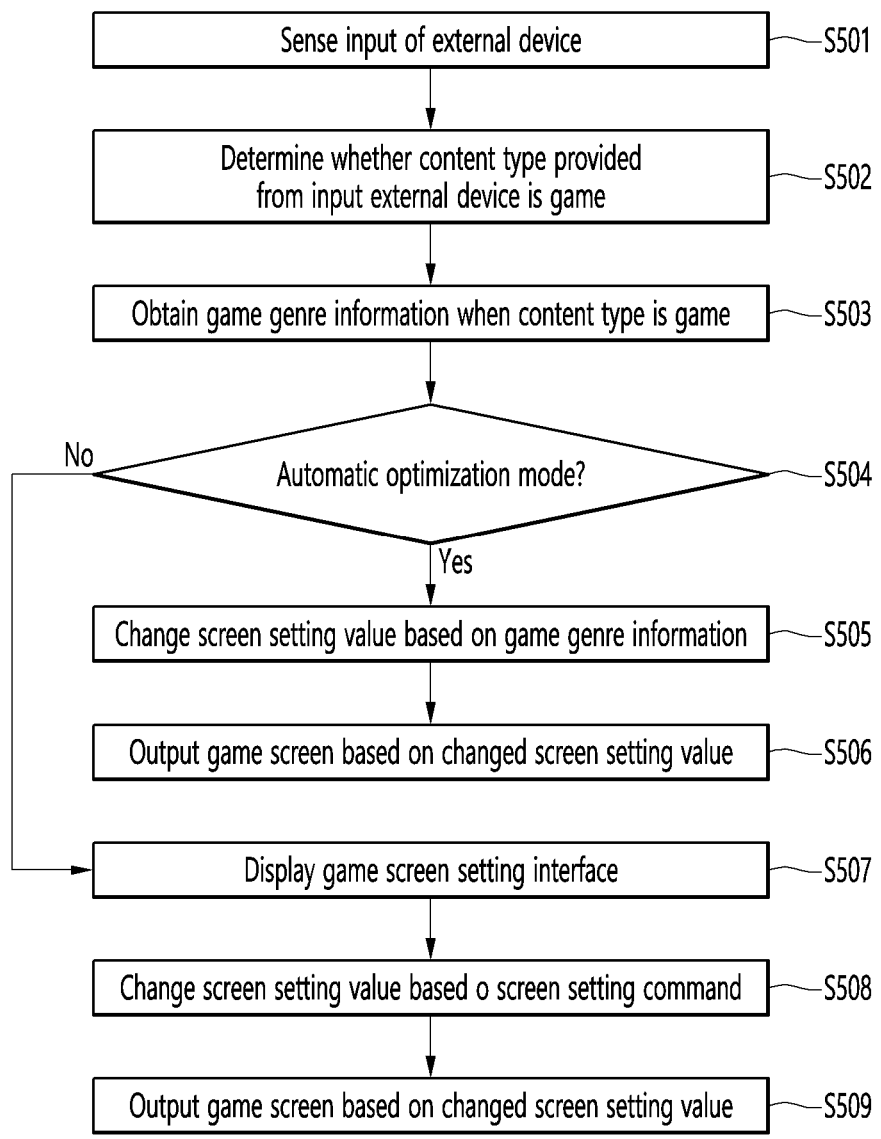
FIG. 5 is a flowchart of a method of displaying a game screen, according to an embodiment of the present disclosure.

FIG. 5 is a flowchart of a method of displaying a game screen, according to an embodiment of the present disclosure.

The processor 170 may sense the input of the external device 300 input through the external device interface 135 (S501).

The display device 100 may be connected to the external device 300 through the external device interface 135.

The external device 300 may be any one of a set-top box, a Blu-ray player, a DVD player, a game console, a sound bar, a smart phone, a PC, a USB memory, and a home theater, but this is only an example.

Figure 6:
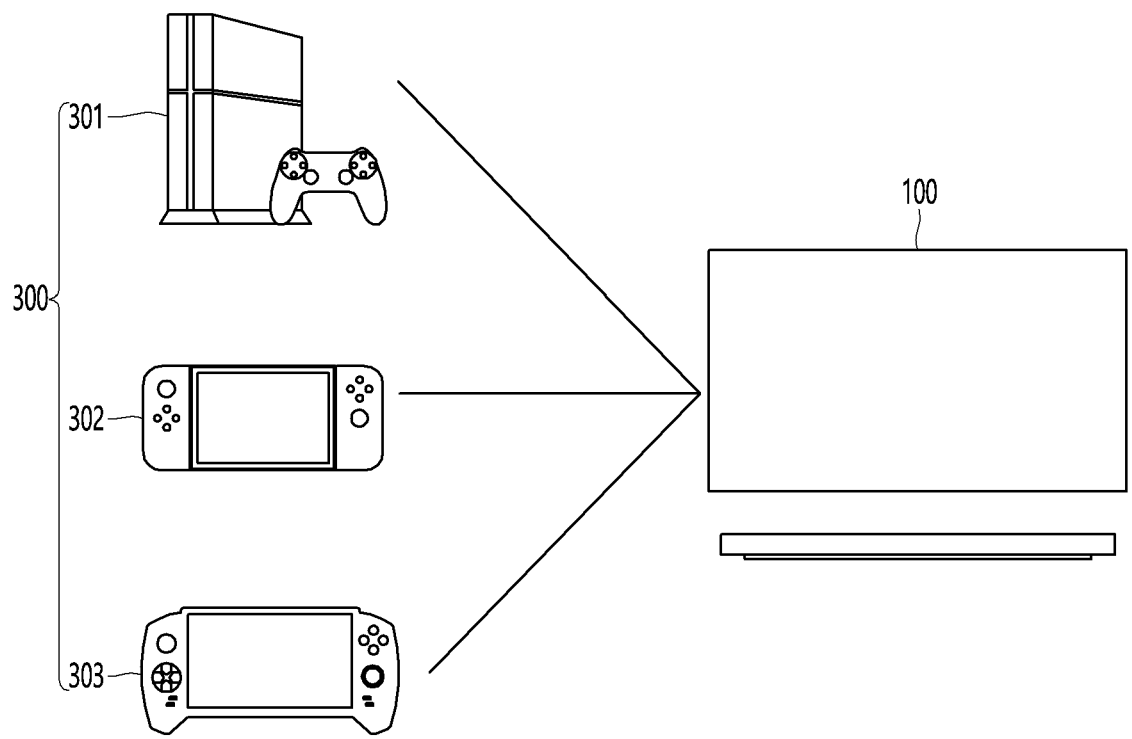
FIG. 6 is a diagram illustrating a display device to which an external device is input, according to an embodiment of the present disclosure.

Referring to FIG. 6, in the display device 100, one or more external devices 301, 302, and 303 may be input through the external device interface 135.

Meanwhile, the processor 170 may determine whether the type of content provided from the input external device 300 is a game (S502).

The processor 170 may receive content information from the external device 300 through the external device interface 135.

The content information may include content inclusion/non-inclusion information about whether the external device 300 provides content other than video, and content type information about the type of the provided content.

Figure 7:
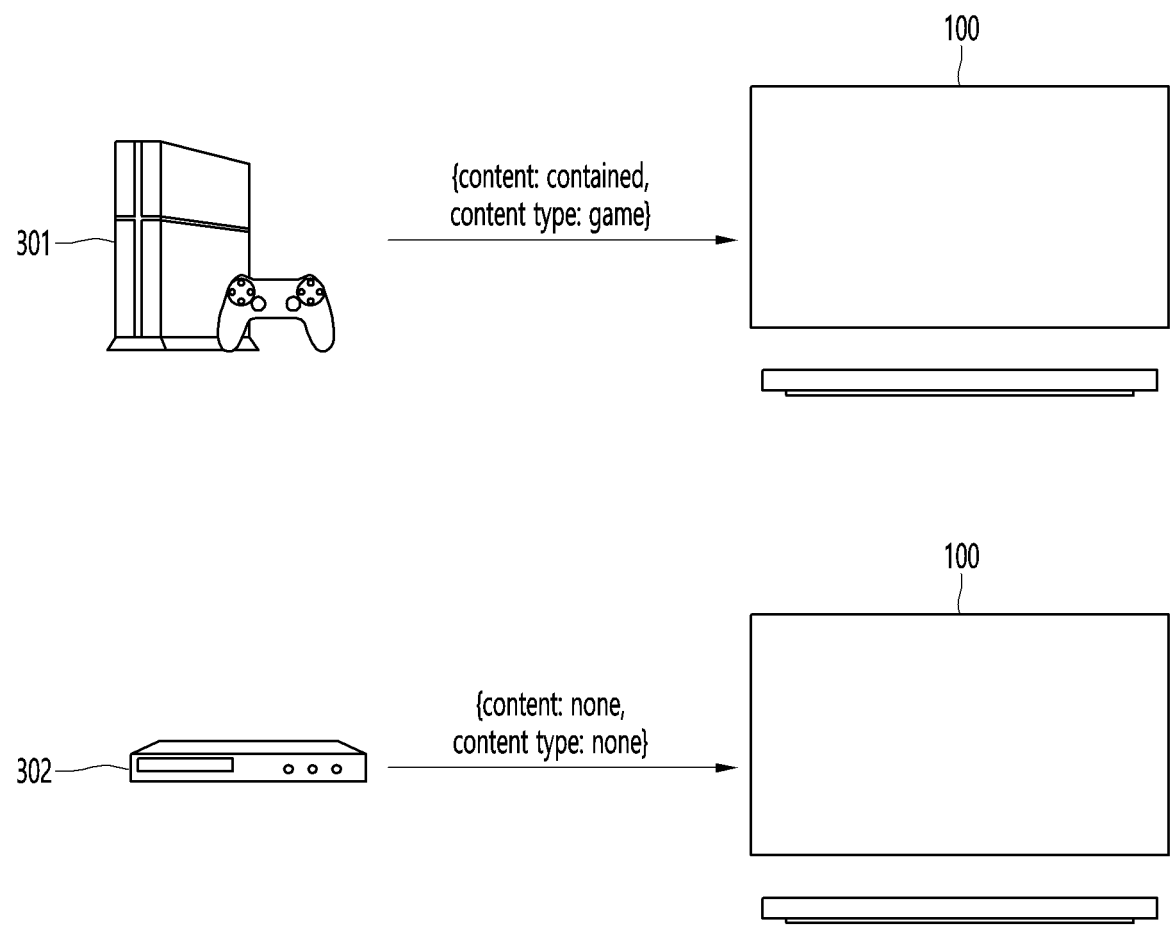
FIG. 7 is a view for describing a method of receiving content information from an external device, according to an embodiment of the present disclosure.

For example, referring to FIG. 7, the display device 100 may receive content inclusion information and information about the type of the content from the connected first external device 301.

For example, when the first external device 301 is a device capable of playing a game and the first external device 301 provides content information to the display device 100 through the external device interface 135, content information including information {content: contained, content type: game} may be transmitted to the display device 100.

In addition, for example, referring to FIG. 7, the display device 100 may receive content inclusion information and information about the type of the content from the connected second external device 302.

For example, when the second external device 302 is a video playing device and the second external device 302 provides content information to the display device 100 through the external device interface 135, content information including information {content: none, content type: none} may be transmitted to the display device 100. That is, according to some embodiments, when the external device 300 plays a video, it may be determined that content other than the video is not included.

Therefore, the processor 170 may determine whether the type of content provided by the external device 300 is a game, based on the content information received from the external device 300.

Meanwhile, when the type of content is a game, the processor 170 may obtain game genre information (S503).

When the type of content provided by the external device 300 is a game, the processor 170 may obtain game genre information about the provided game.

The game genre information may include information about a game genre classified by a game play format or a game material. For example, the game genre information may include information about whether the game provided by the external device 300 corresponds to a game genre such as a role playing game (RPG), a first person-shooter (FPS), and a real-time strategy game.

The processor 170 may receive game genre information about the genre of the game provided by the external device 300 from the external device 300 through the external device interface 135.

Meanwhile, when the game running on the external device 300 is a game provided by the cloud server 400, the processor 170 may obtain game genre information of the game running on the external device 300 from the cloud server 400 through the wireless communication interface 173.

Figure 8:
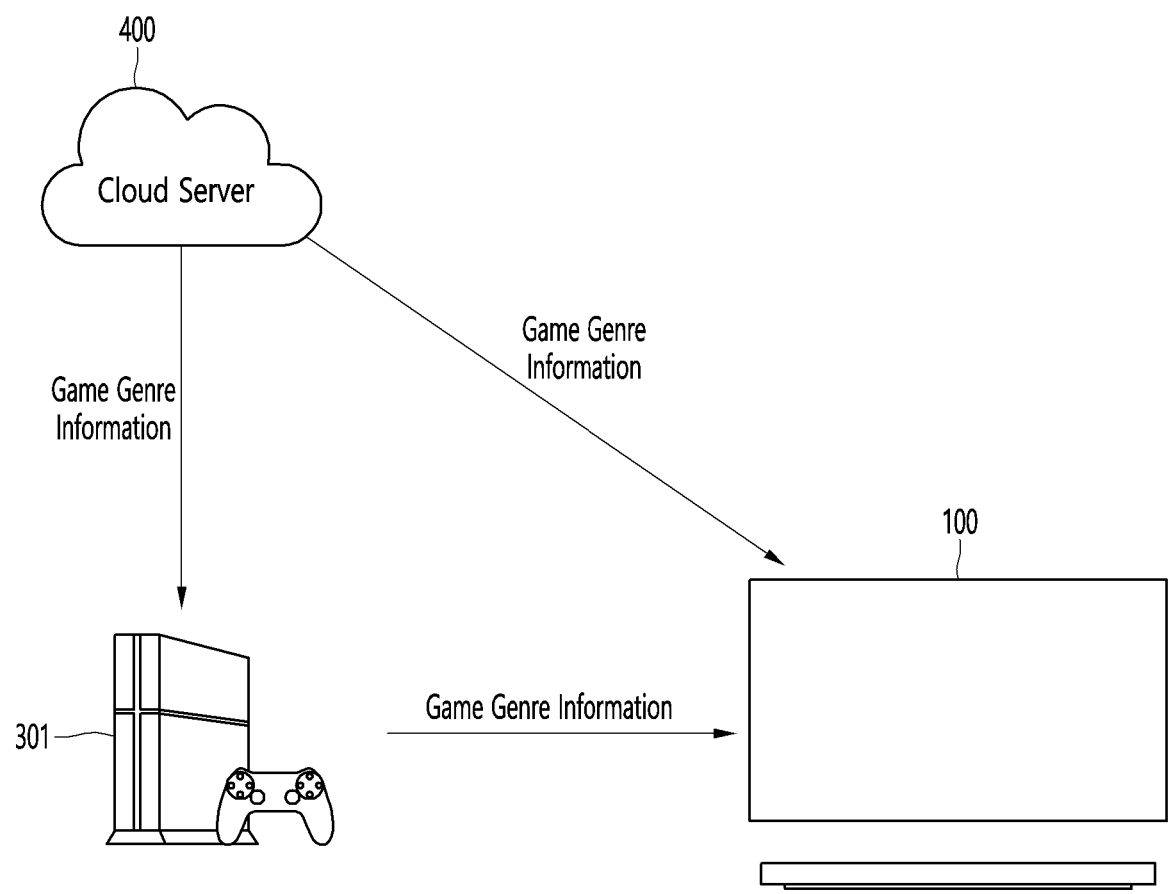
FIG. 8 is an exemplary view for describing a method of obtaining game genre information, according to an embodiment of the present disclosure.

For example, referring to FIG. 8, the first external device 301 receives game genre information about the genre of the running game from the first external device 301, and may transmit the received game genre information to the display device 100. Alternatively, the display device 100 may access the cloud server 400 to receive the game genre information.

Meanwhile, the processor 170 may determine whether the screen setting is in the automatic optimization mode (S504).

The automatic optimization mode may refer to a mode in which the optimal game screen can be provided by changing the screen output setting value according to the genre of the game provided by the external device 300.

When the screen setting is in the automatic optimization mode, the processor 170 may change the screen setting value based on the game genre information (S505).

The screen setting value may include a value capable of setting the brightness of the screen. For example, the screen setting value may include a correction value for the brightness of the pixel output with respect to the input brightness of the pixel.

The processor 170 may control the output brightness of the screen output through the display 180 by increasing or decreasing the input brightness of the screen input from the external device 300 by a predetermined value based on the game genre information.

Figure 9:
FIG. 9 is a view for describing brightness setting according to an embodiment of the present disclosure.
Figure 10:
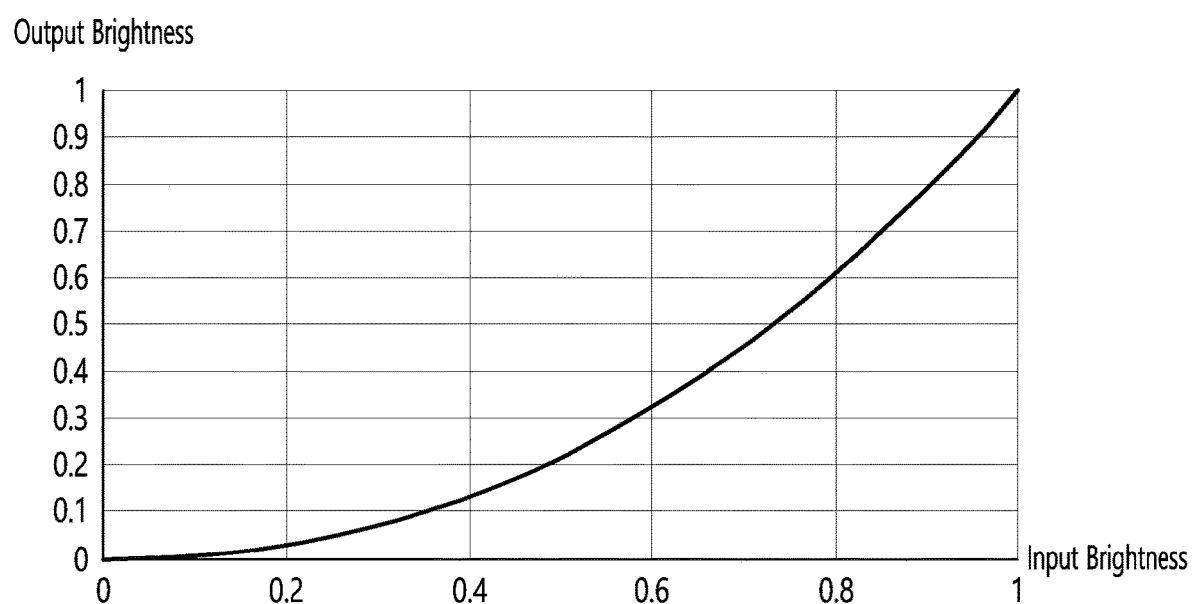
FIG. 10 is a view for describing brightness setting according to an embodiment of the present disclosure.

FIG. 9 is a view for describing brightness setting according to an embodiment of the present disclosure. FIG. 9 illustrates the relationship of the brightness value of the screen output through the display 180 by the display device 100, based on the brightness value of the screen input from the external device 300. For example, the display device 100 may maintain the brightness of the output pixel corresponding to the brightness of the specific pixel of the input screen as it is, and output the screen through the display 180. In addition, referring to FIG. 10, in some embodiments, the display device 100 may lower a brightness value output in most areas of the input brightness value.

The processor 170 may change an output screen brightness value with respect to the input screen brightness based on the game genre information.

Also, the processor 170 may output the game screen through the display 180 based on the changed screen setting value (S506).

Figure 11:
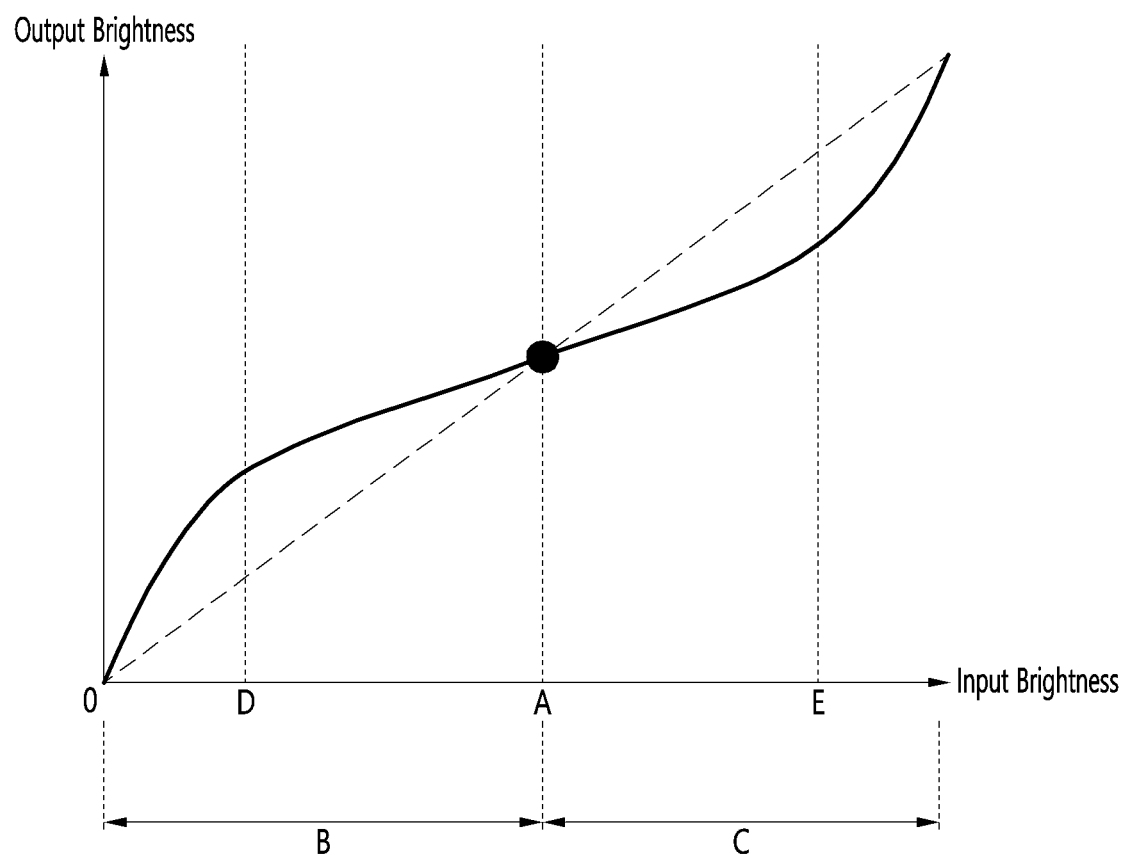
FIG. 11 is a view for explaining a screen setting value for a first game genre, according to an embodiment of the present disclosure.

FIG. 11 is a view for describing a screen setting value for a first game genre according to an embodiment of the present disclosure.

The first game genre may include a game genre that requires distinction between characters or objects on the game screen. The first game genre may include a game genre in which a weapon is used while avoiding an enemy attack. The first game genre may be a genre related to a shooting game. For example, the first game genre may include a shooter game (STG) genre, a battle royale role genre, a first-person shooter (FPS), and a third-person shooter genre. The first game genre may be a genre related to a shooting game.

When the game genre information is a first game genre related to a shooting game, and when the first input brightness of the screen input from the external device 300 is lower than a predetermined first reference brightness, the processor 170 increases the first output brightness by a predetermined increase value with respect to the first input brightness. When the first input brightness is higher than the first reference brightness, the processor 170 may decrease the first output brightness by a predetermined decrease value with respect to the first input brightness.

Referring to FIG. 11, when the game genre information is a first game genre, and when the input brightness corresponds to a section B lower than a predetermined reference brightness A, the processor 170 may output the intensity of the output brightness brighter than the input brightness by the predetermined increase value. When the input brightness corresponds to a section C higher than the predetermined reference brightness A, the processor 170 may output the intensity of the output brightness darker than the input brightness by the predetermined decrease value.

Meanwhile, the predetermined reference brightness A may be a middle brightness value between a minimum input brightness and a maximum input brightness.

In addition, when the input brightness corresponds to the section B lower than the predetermined reference brightness A, the processor 170 may output the game screen up to a maximum brightness increase point D while increasing the increase value of the output brightness. In addition, the processor 170 may output the game screen while decreasing the increase value of the output brightness from the maximum brightness increase point D to the reference brightness A. The maximum brightness increase point D may be a middle point between the minimum brightness and the reference brightness A, or a point of ⅓ or ⅔ of the middle point.

In addition, when the input brightness corresponds to the section C higher than the predetermined reference brightness A, the processor 170 may output the game screen up to a maximum brightness increase point E while increasing the decrease value of the output brightness. In addition, the processor 170 may output the game screen while decreasing the decrease value of the output brightness from the maximum brightness increase point E to the maximum brightness. The maximum brightness increase point E may be a middle point between the reference brightness A and the maximum brightness, or a point of ⅓ or ⅔ of the middle point.

Therefore, the processor 170 may output a portion of the screen (e.g., a pixel) darker than a predetermined reference value brighter in the game screen input from the external device 300, and outputs a portion of the screen (e.g., a pixel) brighter than a predetermined reference value darker, thereby distinguishing game characters or objects.

Figure 12:
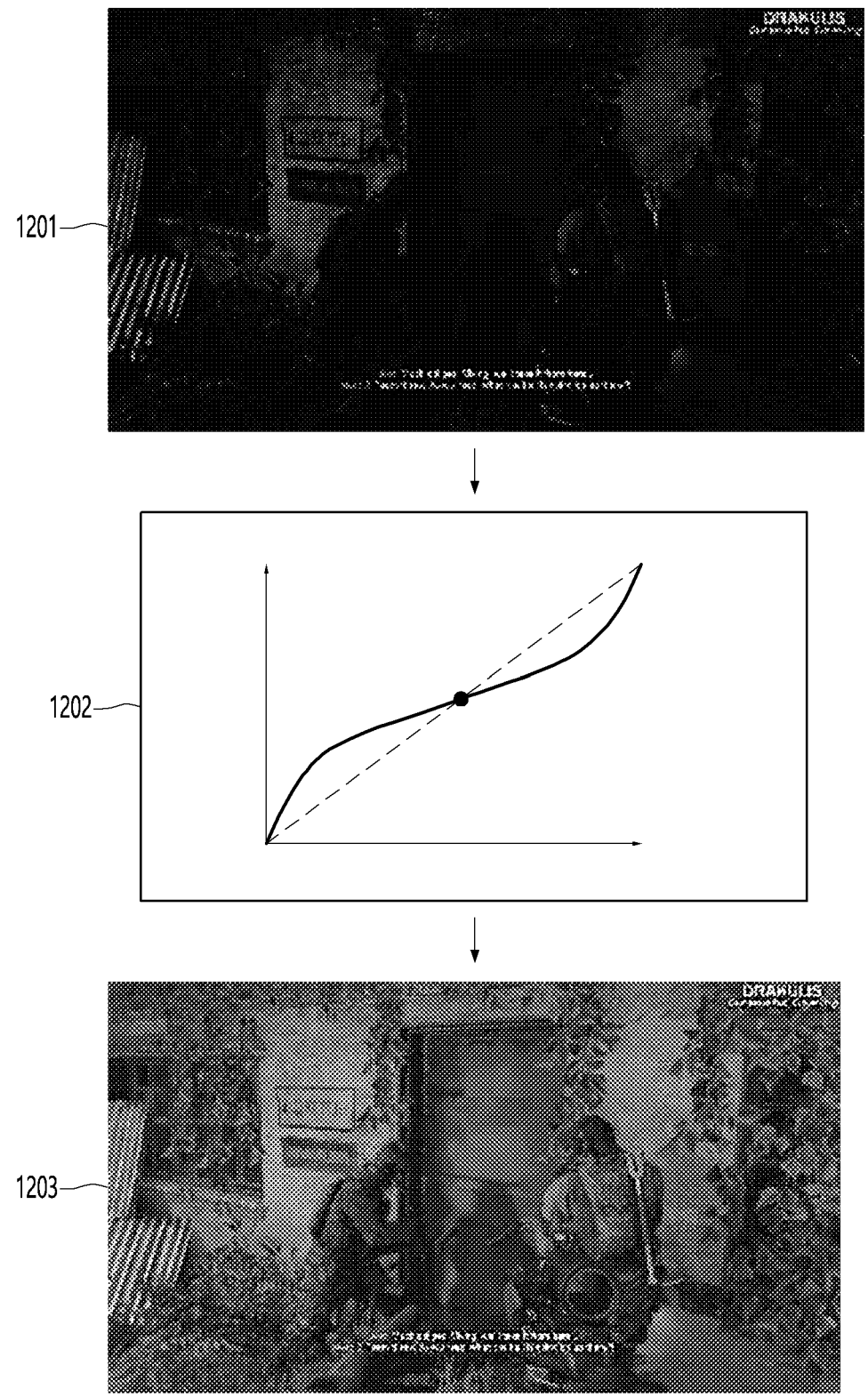
FIG. 12 is an exemplary view for describing a screen output of a first game genre, according to an embodiment of the present disclosure.

FIG. 12 is an exemplary view for describing a screen output of a first game genre, according to an embodiment of the present disclosure.

Referring to FIG. 12, a first game screen 1201 corresponding to a first game genre may be input from the external device 300 to the display device 100. The processor 170 may change a screen setting value of the first game screen 1201 corresponding to the first game genre to a first game genre mode setting 1202. The processor 170 may output a lower input brightness with a higher output brightness through the display 180, based on a predetermined reference brightness A, and output a higher input brightness with a lower output brightness through the display 180, thereby outputting a first game screen 1203 with improved discrimination.

Figure 13:
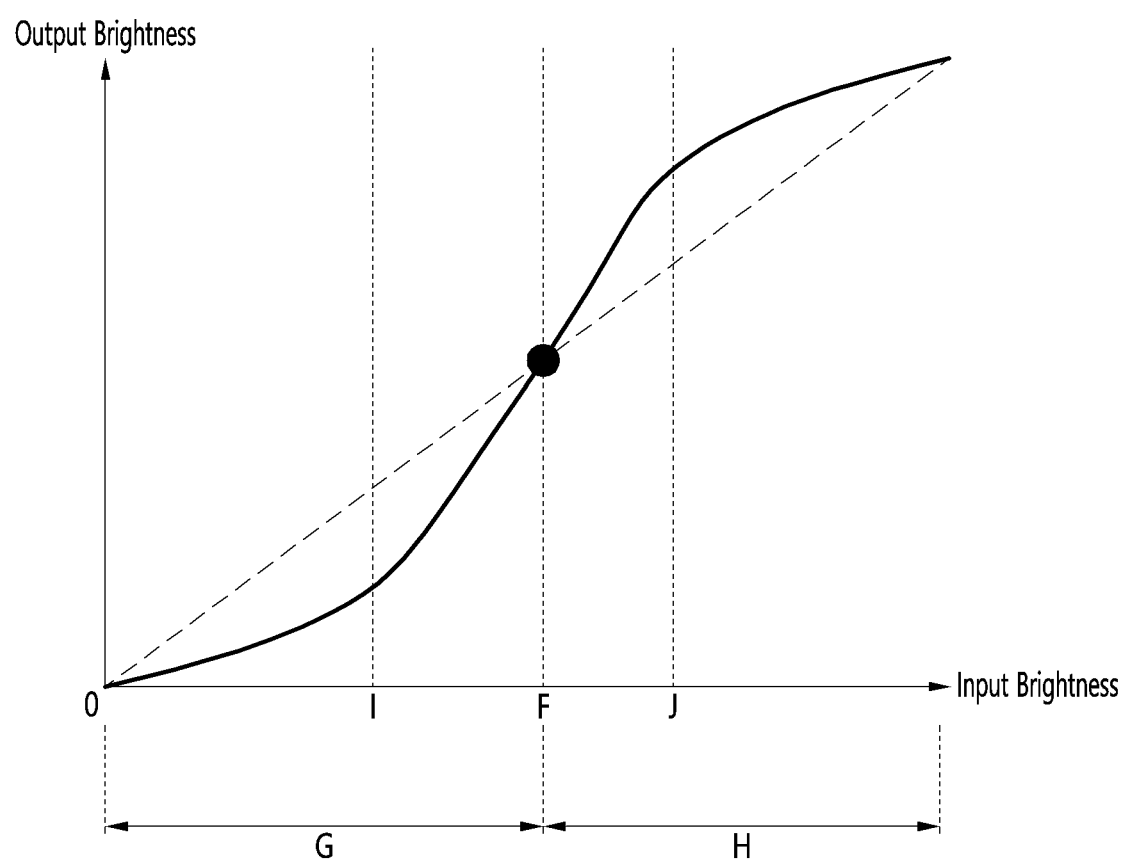
FIG. 13 is a view for describing a screen setting value for a second game genre, according to an embodiment of the present disclosure.

FIG. 13 is a view for describing a screen setting value for a second game genre according to an embodiment of the present disclosure.

The second game genre may include a game genre that manipulates a character (player character) assigned to each and aims at achieving a goal given in a virtual situation. For example, the second game genre may include a role-playing game (RPG) genre.

When the game genre information is a second game genre related to a role-playing game, and when the second input brightness of the screen input from the external device 300 is lower than a predetermined second reference brightness, the processor 170 may decrease the second output brightness by a predetermined decrease value with respect to the second input brightness. When the second input brightness is higher than the second reference brightness, the processor 170 may increase the second output brightness by a predetermined increase value with respect to the second input brightness.

Referring to FIG. 13, when the game genre information is a second game genre, and when the input brightness corresponds to a section G lower than a predetermined reference brightness F, the processor 170 may output the intensity of the output brightness darker than the input brightness by the predetermined decrease value. When the input brightness corresponds to a section H higher than the predetermined reference brightness F, the processor 170 may output the intensity of the output brightness brighter than the input brightness by the predetermined increase value. Meanwhile, the predetermined reference brightness F may be a middle brightness value between a minimum input brightness and a maximum input brightness.

In addition, when the input brightness corresponds to the section G lower than the predetermined reference brightness F, the processor 170 may output the game screen darker up to a maximum brightness decrease point I while increasing the decrease value of the output brightness. In addition, the processor 170 may output the game screen while decreasing the increase value of the output brightness from the maximum brightness decrease point I to the reference brightness F. The maximum brightness decrease point I may be a middle point between the minimum brightness and the reference brightness F, or a point of ⅓ or ⅔ of the middle point.

In addition, when the input brightness corresponds to the section H higher than the predetermined reference brightness F, the processor 170 may output the game screen up to a maximum brightness increase point J while increasing the increase value of the output brightness. In addition, the processor 170 may output the game screen while decreasing the increase value of the output brightness from the maximum brightness increase point J to the maximum brightness. The maximum brightness increase point J may be a middle point between the reference brightness F and the maximum brightness, or a point of ⅓ or ⅔ of the middle point.

Therefore, the processor 170 may output a portion of the screen (e.g., a pixel) darker than a predetermined reference brightness darker in the game screen input from the external device 300, and outputs a portion of the screen (e.g., a pixel) brighter than a predetermined reference value brighter, thereby the visibility of game characters. That is, the processor 170 may output, through the display 180, a game screen in which a bright portion is processed brighter and a dark portion is processed darker by emphasizing a contrast ratio of the game screen with respect to the second game genre.

Figure 14:
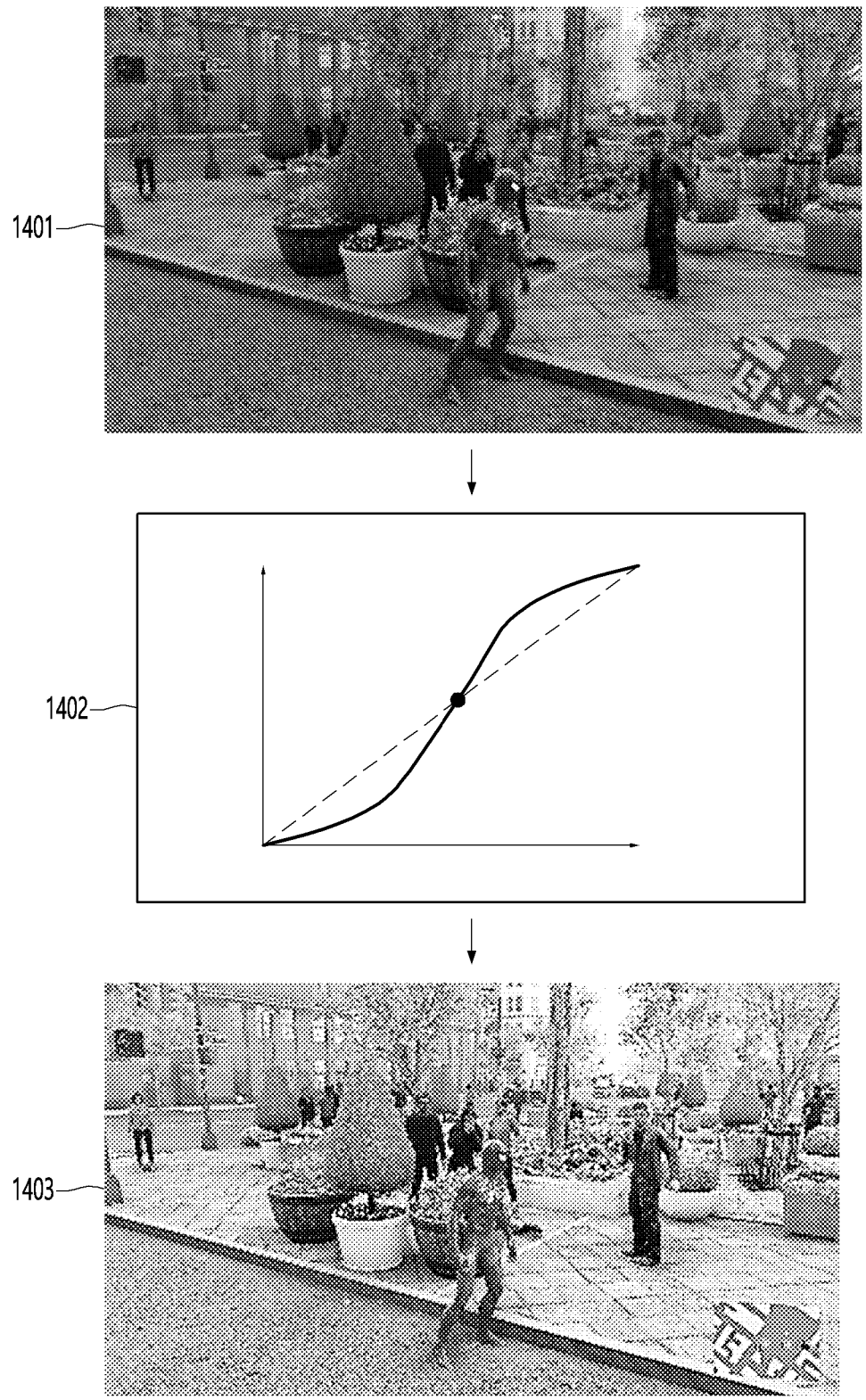
FIG. 14 is an exemplary view for explaining a screen output of a second game genre, according to an embodiment of the present disclosure.

FIG. 14 is an exemplary view for explaining the screen output of the second game genre, according to an embodiment of the present disclosure.

Referring to FIG. 14, the second game screen 1401 corresponding to the second game genre may be input from the external device 300 to the display device 100. The processor 170 may change a screen setting value of the second game screen 1401 corresponding to the second game genre to a second game genre mode setting 1402. The processor 170 may output a lower input brightness with a lower output brightness through the display 180, based on a predetermined reference brightness F, and output a higher input brightness with a higher output brightness through the display 180, thereby outputting a second game screen 1403 with improved visibility of characters.

Figure 15:
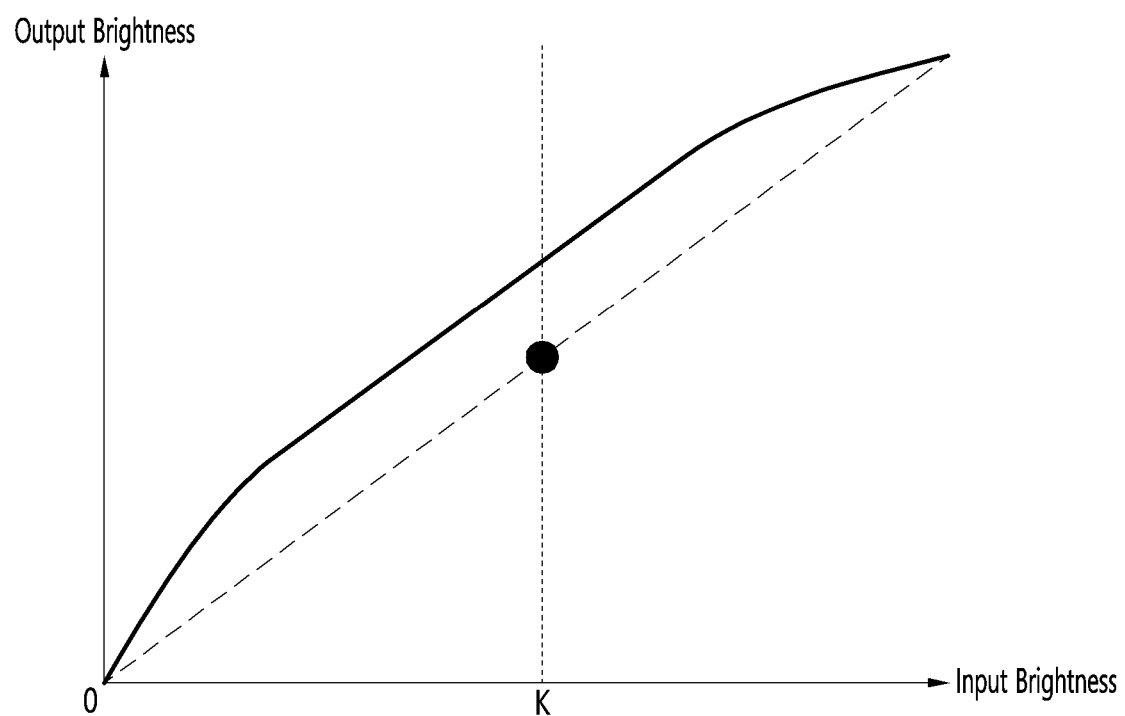
FIG. 15 is a view for describing a screen setting value for a third game genre, according to an embodiment of the present disclosure.

FIG. 15 is a view for describing a screen setting value for a third game genre, according to an embodiment of the present disclosure.

The third game genre may include a game genre in such a manner that an enemy has to be eliminated and an objective has to be achieved by utilizing a strategic element given in the game. For example, the third game genre may include a real-time strategy (RTS) game genre.

Referring to FIG. 15, when the game genre information is the third game genre, the processor 170 may output the intensity of the output brightness brighter than the input brightness by a predetermined increase value.

In addition, the processor 170 may output the game screen brighter while increasing an increase value of the output brightness with respect to the input brightness from the minimum input brightness to the maximum brightness increase point K. In addition, the processor 170 may output the game screen while decreasing the increase value of the output brightness from the maximum brightness increase point K to the maximum brightness. The maximum brightness increase point K may be a middle input brightness value between a minimum input brightness and a maximum input brightness.

Figure 16:
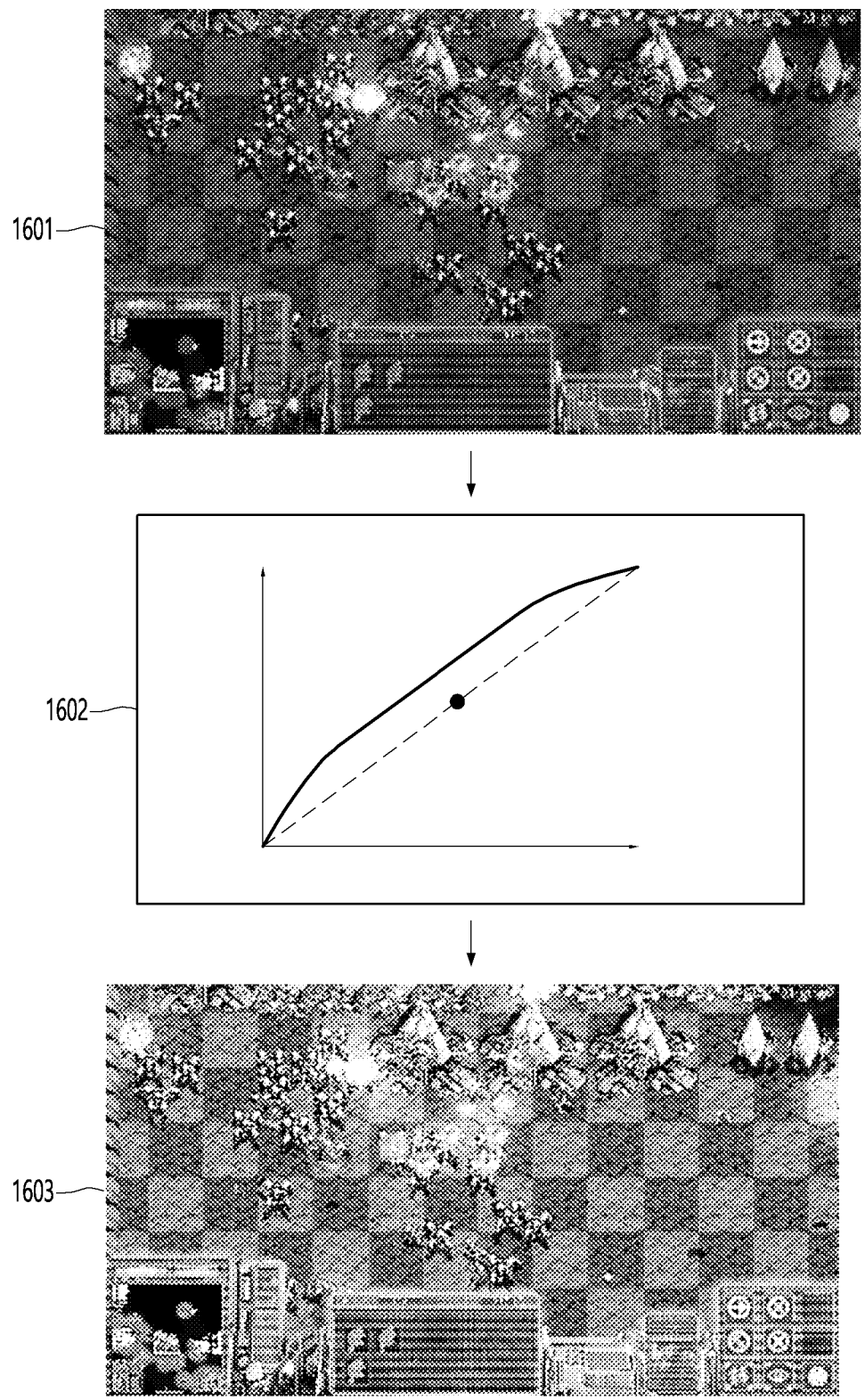
FIG. 16 is an exemplary view for describing a screen output of a third game genre, according to an embodiment of the present disclosure.

FIG. 16 is an exemplary view for describing a screen output of a third game genre, according to an embodiment of the present disclosure.

Referring to FIG. 16, a third game screen 1601 corresponding to the second game genre may be input from the external device 300 to the display device 100. The processor 170 may change a screen setting value of the third game screen 1601 corresponding to the third game genre to a third game genre mode setting 1602. The processor 170 may output the game screen brighter while increasing an increase value of the output brightness with respect to the input brightness from the minimum input brightness to the maximum brightness increase point K. In addition, the processor 170 may output the game screen while decreasing the increase value of the output brightness from the maximum brightness increase point K to the maximum brightness. Therefore, even in a scene where several characters are mixed on the game screen, the third game screen 1603 with enhanced brightness and sharpness may be output so that the boundary is clearly distinguished.

Referring back to FIG. 5, when the screen setting is not in the automatic optimization mode, the processor 170 may display a game screen setting interface (S507).

The game screen setting interface may display the game screen setting value that is changed according to the game genre, and may include a button that allows a user to select whether to change the game screen setting value.

For example, the game screen setting interface may include an interface for setting a reference brightness (A, F) value, a maximum brightness increase point (D, J), and a maximum brightness decrease point (E, G) that may be set according to the first game genre or the second game genre. In addition, an interface for setting a brightness increase or decrease value may be included.

In addition, for example, the game screen setting interface may include an interface for setting a reference brightness (k) value and a brightness increase value that may be set for the third game genre.

The processor 170 may receive a command about screen setting from a user through the user input interface 150 (S508).

The processor 170 may receive a screen setting command when the user inputs the screen setting command in the game screen setting interface using the remote control device 200 or the like.

The processor 170 may change the screen setting value based on the screen setting command (S509). The processor 170 may output the game screen through the display 180 based on the changed screen setting value (S510).

Therefore, the display device 100 may provide an optimal game screen desired by the user.

According to an embodiment of the present disclosure, an optimal game screen may be displayed for each game genre.

According to an embodiment of the present disclosure, the genre of games input from an external device may be determined and an optimal game screen may be automatically displayed for each game genre.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to describe the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

What is claimed is:

1. A display device comprising:
an external device interface for communicating with an external device;
a display; and
a processor configured to:
determine whether content received from the external device is a video game;
based on a determination that the received content is the video game, obtain genre information of the video game from the external device;
determine whether an automatic optimization mode is set;
display, via the display, a game screen setting interface including a screen setting value optimized according to the obtained genre information of the video game based on a determination that the automatic optimization mode is not set;
control the screen setting value with respect to an input brightness of a pixel based on a determination that the automatic optimization mode is set or based on a user input received via the game screen setting interface; and
output the video game optimized according to the genre information;
wherein the screen setting value optimized according to the obtained genre information comprises a reference brightness value determined between a minimum input brightness value and maximum input brightness value of the received video game, a maximum brightness increase point determined between the minimum input brightness value and the reference brightness value, and a maximum brightness decrease point determined between the maximum input brightness value and the reference brightness value.

2. The display device of claim 1, wherein the processor is further configured to, based on a determination that the genre information is a first game genre:
increase the output brightness by a predetermined increase value with respect to a first input brightness of the content received from the external device based on a determination that the first input brightness is less than a predetermined first reference brightness, wherein the processor increases the predetermined increase value of the output brightness; and
decrease the output brightness by a predetermined decrease value with respect to the first input brightness based on a determination that the first input brightness is greater than the predetermined first reference brightness, wherein the processor increases the predetermined decrease value of the output brightness.

3. The display device of claim 2, wherein the predetermined first reference brightness is a middle brightness value between a minimum input brightness value and a maximum input brightness value.

4. The display device of claim 2, wherein the processor is further configured to increase the predetermined increase value of the output brightness with respect to the first input brightness from the first input brightness up to the maximum brightness increase point and decrease the predetermined increase value of the output brightness from the maximum brightness increase point to the predetermined first reference brightness when the first input brightness is less than the predetermined first reference brightness.

5. The display device of claim 2, wherein the processor is further configured to increase the predetermined decrease value of the output brightness with respect to the first input brightness from the first input brightness up to the maximum brightness decrease point and decreases the predetermined decrease value of the output brightness from the maximum brightness decrease point to a maximum input brightness value when the first input brightness is greater than the predetermined first reference brightness.

6. The display device of claim 1, wherein the processor is further configured to, based on a determination that the genre information is a second game genre:
decrease the output brightness by a predetermined decrease value with respect to the second input brightness of the content received from the external device based on a determination that the second input brightness is less than a predetermined second reference brightness; and
increase the output brightness by a predetermined increase value with respect to the second input brightness based on a determination that the second input brightness is greater than the predetermined second reference brightness.

7. The display device of claim 6, wherein the second reference brightness is a middle brightness value between a minimum input brightness value and a maximum input brightness value.

8. The display device of claim 6, wherein the processor is further configured to increase the predetermined decrease value of the output brightness with respect to the second input brightness up to a second maximum brightness decrease point when the second input brightness is less than the predetermined second reference brightness.

9. The display device of claim 6, wherein the processor is further configured to increase the predetermined increase value of the output brightness with respect to the second input brightness up to a second maximum brightness increase point when the second input brightness is greater than the predetermined second reference brightness.

10. The display device of claim 1, wherein the processor is further configured to, based on a determination that the genre information is a third game genre:
increase the output brightness by a predetermined increase value with respect to a third input brightness of the content received from the external device.

11. The display device of claim 10, wherein the processor is further configured to increase the predetermined increase value of the third output brightness with respect to the third input brightness from a minimum input brightness to a predetermined maximum brightness increase point.

12. The display device of claim 11, wherein the predetermined maximum brightness increase point is a middle brightness value between a minimum input brightness value and a maximum input brightness value.

13. A method for displaying a game screen from an external device, the method comprising:
determining whether content received from the external device is a video game;
obtaining, from the external device, genre information of the video game based on a determination that the received content is a video game;
determining whether an automatic optimization mode is set;
displaying a game screen setting interface including a screen setting value optimized according to the obtained genre information of the video game based on a determination that the automatic optimization mode is not set;
controlling the screen setting value with respect to an input brightness of a pixel based on a determination that the automatic optimization mode is set or based on a user input received via the game screen setting interface; and
outputting the video game optimized according to the genre information;
wherein the screen setting value optimized according to the obtained genre information comprises a reference brightness value determined between a minimum input brightness value and maximum input brightness value of the received video game, a maximum brightness increase point determined between the minimum input brightness value and the reference brightness value, and a maximum brightness decrease point determined between the maximum input brightness value and the reference brightness value.

14. The method of claim 13, wherein the controlling the screen setting value to be optimized according to the genre information comprises:
based on a determination that the genre information is a first game genre:
increasing the output brightness by a predetermined increase value with respect to a first input brightness of the content received from the external device based on a determination that the first input brightness is less than a predetermined first reference brightness, wherein the processor increases the predetermined increase value of the output brightness, wherein the processor is further configured to increase the predetermined increase value of the output brightness with respect to the first input brightness from the first input brightness up to the maximum brightness increase point and decrease the predetermined increase value of the output brightness from the maximum brightness increase point to the predetermined first reference brightness when the first input brightness is less than the predetermined first reference brightness; and decreasing the output brightness by a predetermined decrease value with respect to the first input brightness based on a determination that the first input brightness is greater than the predetermined first reference brightness, wherein the processor increases the predetermined decrease value of the output brightness, wherein the processor is further configured to increase the predetermined decrease value of the output brightness with respect to the first input brightness from the first input brightness up to the maximum brightness decrease point and decreases the predetermined decrease value of the output brightness from the maximum brightness decrease point to a maximum input brightness value when the first input brightness is greater than the predetermined first reference brightness.

15. The method of claim 13, wherein the controlling the screen setting value to be optimized according to the genre information comprises:

based on a determination that the genre information is a second game genre:

decreasing the output brightness by a predetermined decrease value with respect to the second input brightness of the content received from the external device based on a determination that the second input brightness is less than a predetermined second reference brightness; and increasing the output brightness by a predetermined increase value with respect to the second input brightness based on a determination that the second input brightness is greater than the predetermined second reference brightness.

16. The method of claim 13, wherein the controlling the screen setting value to be optimized according to the genre information comprises:

based on a determination that the genre information is a third game genre:

increasing the output brightness by a predetermined increase value with respect to a third input brightness of the video game received from the external device, wherein the processor is further configured to increase the predetermined increase value of the third output brightness with respect to the third input brightness from a minimum input brightness to a predetermined maximum brightness increase point.

* * * * *